(12) United States Patent
Bramhill et al.

(10) Patent No.: US 10,846,115 B1
(45) Date of Patent: Nov. 24, 2020

(54) TECHNIQUES FOR MANAGING VIRTUAL INSTANCE DATA IN MULTITENANT ENVIRONMENTS

(71) Applicant: Amazon Technologies, Inc., Seattle, WA (US)

(72) Inventors: Gavin Alexander Bramhill, Cape Town (ZA); Andries Petrus Johannes Dippenaar, Cape Town (ZA); Mathew Daniel, Cape Town (ZA); Martin Stephen van Tonder, Cape Town (ZA); Alexander Emmanuel Kafui Mallet, Cape Town (ZA); Roland Alexander Paterson-Jones, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 519 days.

(21) Appl. No.: 14/822,811

(22) Filed: Aug. 10, 2015

(51) Int. Cl.
*H04L 12/24* (2006.01)
*G06F 9/455* (2018.01)

(52) U.S. Cl.
CPC .. *G06F 9/45558* (2013.01); *G06F 2009/4557* (2013.01)

(58) Field of Classification Search
CPC ..................... G06F 9/45558; G06F 2009/4557
USPC ........................................................ 709/201
See application file for complete search history.

(56) References Cited

U.S. PATENT DOCUMENTS

| 8,276,140 | B1* | 9/2012 | Beda, III | G06F 9/5077 709/224 |
| 8,615,579 | B1* | 12/2013 | Vincent | G06F 9/4856 709/224 |
| 9,519,699 | B1* | 12/2016 | Kulkarni | G06F 16/2471 |
| 2002/0016892 | A1* | 2/2002 | Zalewski | G06F 9/5077 711/153 |
| 2006/0184935 | A1* | 8/2006 | Abels | G06F 9/5077 718/1 |
| 2006/0271395 | A1* | 11/2006 | Harris | G06F 9/52 718/1 |
| 2009/0328145 | A1* | 12/2009 | Berger | G06F 21/57 726/3 |
| 2011/0040942 | A1* | 2/2011 | Akirav | G06F 17/30575 711/159 |
| 2011/0247017 | A1* | 10/2011 | Hopkins | G06F 17/30283 719/328 |
| 2012/0030671 | A1* | 2/2012 | Matsubara | H04L 67/34 718/1 |

(Continued)

*Primary Examiner* — Moustafa M Meky
*Assistant Examiner* — Elizabeth Kassa
(74) *Attorney, Agent, or Firm* — Davis Wright Tremaine LLP

(57) ABSTRACT

Techniques described and suggested herein include systems and methods for updating, adding, deleting, managing, and otherwise manipulating instance data across multiple virtual instances in an addressable fashion. For example, a customer may control or otherwise be associated with a fleet of virtual instances running on one or more hosts of a computing resource service provider. The described techniques enable customers, or other entities, to update instance data related to arbitrarily defined groups of the fleet using, e.g., tags or other common identifiers, so as to, e.g., alter operational characteristics of some or all of a given fleet of virtual instances without necessitating individual alteration of each instance.

20 Claims, 8 Drawing Sheets

(56) References Cited

U.S. PATENT DOCUMENTS

| | | | | |
|---|---|---|---|---|
| 2012/0167076 | A1* | 6/2012 | Arscott | G06F 9/45558 718/1 |
| 2012/0297012 | A1* | 11/2012 | Sharp | G06Q 10/00 709/213 |
| 2013/0212165 | A1* | 8/2013 | Vermeulen | G06F 17/30212 709/203 |
| 2013/0346363 | A1* | 12/2013 | Arakawa | G06F 17/30575 707/610 |
| 2014/0047436 | A1* | 2/2014 | Jayachandran | G06F 8/71 718/1 |
| 2014/0207824 | A1* | 7/2014 | Brandwine | G06F 21/6209 707/785 |
| 2014/0281131 | A1* | 9/2014 | Joshi | G06F 12/0804 711/103 |
| 2014/0380315 | A1* | 12/2014 | Khajuria | G06F 17/30233 718/1 |
| 2015/0317175 | A1* | 11/2015 | Tada | G06F 11/1484 718/1 |
| 2016/0021182 | A1* | 1/2016 | Bansal | H04L 67/1095 709/219 |
| 2016/0154713 | A1* | 6/2016 | Zhu | H04L 41/5051 714/4.12 |
| 2016/0173329 | A1* | 6/2016 | Latham | H04L 41/0806 370/254 |
| 2017/0308602 | A1* | 10/2017 | Raghunathan | G06F 16/2365 |

* cited by examiner

TECHNIQUES FOR MANAGING VIRTUAL INSTANCE DATA IN MULTITENANT ENVIRONMENTS

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider as need and depending on their needs.

However, as the usage of network computing grows in accordance with growing demand, the scale of resources, as well as virtualized abstractions of those resources, becomes increasingly complex. Such virtualized abstractions, which include virtual machines or instances, may, in usage, use and generate a considerable amount of data (including metadata) related to operation. Furthermore, a given entity (such as a customer entity) may control a large quantity of such instances, and thus benefit from a simplified way in which to manage or otherwise manipulate the instance data relating to some or all of the instances under the entity's control.

BRIEF DESCRIPTION OF THE DRAWINGS

Various embodiments in accordance with the present disclosure will be described with reference to the drawings, in which.

DETAILED DESCRIPTION

Figure 1:
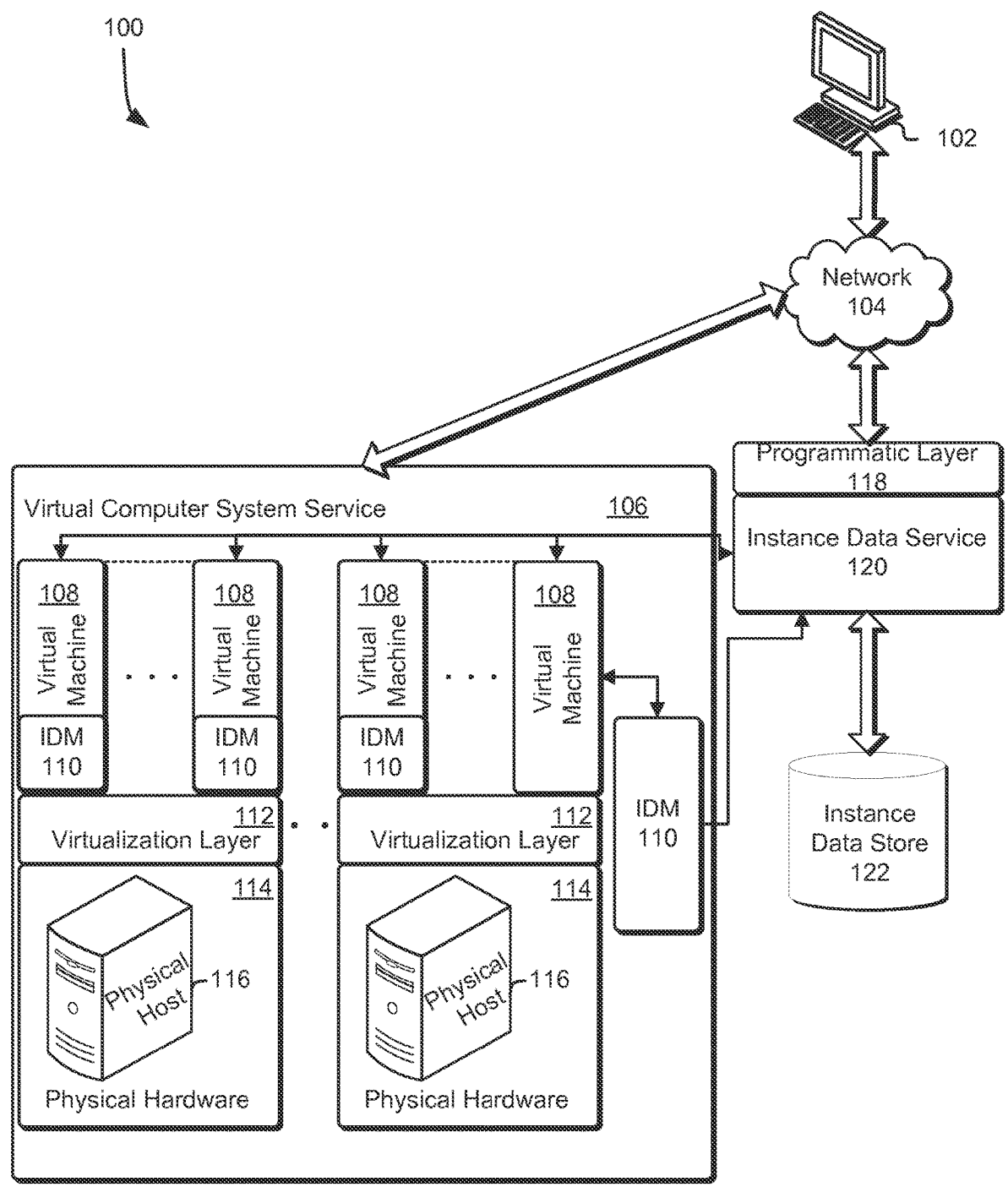
FIG. 1 schematically illustrates an environment implementing an instance data service capable of communicating with a plurality of virtual instances, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for updating, adding, deleting, managing, and otherwise manipulating instance data across multiple virtual instances in an addressable fashion. For example, a customer may control or otherwise be associated with a fleet of virtual instances running on one or more hosts of a computing resource service provider. The described techniques enable customers, or other entities, to update instance data related to arbitrarily defined groups of the fleet using, e.g., tags or other common identifiers, so as to, e.g., alter operational characteristics of some or all of a given fleet of virtual instances without necessitating individual alteration of each instance.

In some embodiments, updates to instance data may be submitted from sources external to an instance to which the update applies. For example, an external service may submit updates to instance data for one or more virtual instances connected or otherwise associated therewith. The external service may, for example, use such instance data to signal operational state to other external services or to a customer utilizing the virtual instances, so as to appropriately coordinate multi-service or multi-instance activities and actions. As another example, a customer or other entity may use a given virtual instance to submit updates to other virtual instances within the customer's/entity's purview. As may be contemplated, inter-instance or service-instance communication may enable activities involving multiple virtual instances, multiple services, or both, to be easily coordinated and managed centrally from an entry closer to the originator or participant of/in the activity/ies.

In some embodiments, an external service responds to and/or processes instance data requests directly. In such embodiments, instance data update requests relevant to the service are forwarded by (e.g., proxied by) a receiving instance data manager and/or instance data service to the external service for handling. The external service then processes the proxied request internally and responds to the request, either directly to the requestor or through the proxying entity (e.g., the instance data manager and/or instance data service). In some embodiments, the external service is responsible for storing the instance data relevant to that service, e.g., in a service data store.

In some embodiments, an entity, such as a customer entity, generates arbitrary instance data to be processed and stored in a similar fashion as instance data generated, e.g., via operation of the virtual instances, such as by entities of the computing resource service provider. For example, a customer submits, through a running virtual instance or from elsewhere, new instance data to be associated with that instance (or other instances). The instance data is synchronized, such as through an instance data manager resident on the virtual instance, with an instance data service and stored on an instance data store. As a result, regardless of the operational state of the virtual instance (e.g., the originating instance, or other instances to which the new instance data is intended to apply), the new instance data is persisted. For example, if a virtual instance is suspended, powered off, or rebooted, the instance data service synchronizes the new instance data in a similar fashion as other instance data when operation of the virtual instance is restored or otherwise resumed.

In some embodiments, customers or other entities (such as external services) are notified when an arbitrarily defined set of instance data is updated, manipulated, removed, added, or the like. Such notifications may be pushed from the instance data managers, the instance data services, or external services responsible for the instance data that was updated. In some embodiments, the notifications may be provided to a specified entity using one or more techniques, such as long-polling, server push, and the like.

FIG. 1 schematically illustrates an environment implementing an instance data service capable of communicating with a plurality of virtual instances, in accordance with some embodiments. A customer entity (also referred to as simply "customer") 102 connects via, e.g., network 104 to a virtual computer system service 106 and, in some embodiments, may also directly connect with an instance data service 120 via programmatic layer 118. The virtual computer system service, instance data service 120, and various other services and functionalities described herein may be provided by a computing resource service provider, described in further detail below. The customer 102 may be an organization that may utilize one or more of the services provided by the computing resource service provider to maintain and deliver information to its employees, which may be located in various geographical locations. Additionally, the customer 102 may be an individual that utilizes the services of the computing resource service provider to deliver content to a working group located remotely.

As used, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests, and/or other such requests from other services within the computer system.

The network 104 may be a communication network, such as the Internet, an intranet or an Internet service provider (ISP) network. Some communications from the customer 102 to the computing resource service provider may cause the computing resource service provider to operate in accordance with one or more embodiments described or a variation thereof.

As previously mentioned, the computing resource service provider may provide various computing resource services to its customers, including the virtual computer system service 106 and the instance data service 120 (along with the programmatic layer 118 through which the instance data service 120 communicates. It is noted that additional services may be provided in addition to or as an alternative to services explicitly described. As described, the various services provided may include one or more web service interfaces or other programmatic interfaces (e.g., programmatic layer 118) that enable the customer 102 to submit appropriately configured application programming interface or web service calls to the various services through web service requests. In addition, each of the services may include one or more service interfaces that enable the services to access each other (e.g., to enable a virtual computer system of the virtual computer system service 106 to store data in or retrieve data from the instance data service 120, etc.).

The virtual computer system service 106 may be a collection of computing resources configured to instantiate virtual machine instances (also interchangeably referred to as "virtual machines," "instances" and "virtual instances" herein) on behalf of the customer 102. The customer 102 may interact with the virtual computer system service 106 (via appropriately configured and authenticated API calls) to provision and operate virtual computer systems that are instantiated on physical computing devices hosted and operated by the computing resource service provider. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 106 is shown in FIG. 1, any other computer system or computer system service may be utilized in the computing resource service provide, such as a computer system or computer system service that does not employ virtualization or instantiation and instead provisions computing resources on dedicated or shared computers/servers and/or other physical devices.

The virtual computer system service 106, which may include or rely on physical hardware 114, is used by the computing resource service provider for providing computation resources for customers (e.g., customer 102 as illustrated). The physical hardware 114 may include physical hosts 116. The physical hosts 116 may be any device or equipment configured to execute instructions for performing data computation, manipulation, or storage tasks, such as a computer or a server. A physical host 116 may be equipped with any needed processing capability including one or more processors, such as a central processing unit (CPU), a graphics processing unit (GPU) or a digital signal processor (DSP), memory, including static and dynamic memory, buses, and input and output ports that are compliant with any handshaking, communications or data transfer protocol. The physical hardware 116 may also include storage devices, such as storage disks and tapes, networking equipment and the like.

A virtualization layer 112 associated with the virtual computer system service 106 enables the physical hardware 114 to be used to provide computational resources upon which one or more virtual machines or instances 108 may operate. The virtualization layer 112 may be any device, software, or firmware used for providing a virtual computing platform for the virtual instances 108. The virtual computer system service may include various virtual computer components, such as one or more virtual CPUs, virtual memory and the like. The virtual hosts 116 may be provided to the customers (e.g., 102) of the computing service resource provider and the customers may run an operating system (e.g., a host operating system) and/or applications on the virtual instances 108. Further, the computing service resource provider may use one or more of its own virtual hosts 108 for executing its applications. Examples of the virtualization layer 440 include a hypervisor, which runs at a higher level of privilege (closer to the actual physical hardware 114) relative to other abstractions, such as the virtual instances 108.

Upon configuration, a resource, for example, a virtual machine of the virtual computer system service 106, may be registered with a customer resource tagging service provided by the computing resource service provider (or, in some embodiments, directly by the virtual computer system service 106), and the customer resource tagging service may associate one or more appropriately configured tags or other identifiers with the resource. A limit may be placed on the number of tags or other identifiers allocated to the entirety of the resources of the customer 102 or the number of tags allocated to any one of the resources used by customer 102.

In some embodiments, the virtual instances 108 each include at least one instance data manager 110 (illustrated as "IDM" in FIG. 1) running within the respective virtual instance 108, such as on a guest operating system operating on the respective virtual instance 108. Each instance data manager 110 may be configured to interact with the instance data service 120, either directly or via a programmatic layer 118 (e.g., over the network 104). The instance data managers 110 may query the instance data service 120 for various instance data (e.g., metadata) persisted on an instance data store 122 connected therewith, and store the instance data obtained from the instance data service 120 in memory of the guest operating system. In some embodiments, the instance data manager can be part of a software development kit provided by the computing resource service provider to the customer 102.

As illustrated, a given IDM 110 may be a separate entity from the virtual machine 108. For example, the IDM 110 may run on a different virtual machine, and/or on a different hardware (and, in some cases, may be an IDM provided by a service and accessed through, for example, an API). In such examples, as well as at least some examples in which the IDM 110 runs within the virtual machine 108 accessing it, authentication and/or trust between the virtual machine 108, the IDM 110, and/or the instance data service 120 may be carried out in a variety of ways. In some embodiments, an IDM 110 receiving a request from a virtual machine 108 to access and/or update metadata may verify with, e.g., the physical host 116 on which the initiating virtual machine 108 is located, the veracity and provenance of the virtual machine 108 itself, as well as its authority to generate such requests. After such a verification is provided, in some cases without further intervention from a user of the virtual machine 108, the request to access and/or update the metadata is passed to the instance data service for servicing. The instance data service 120 may additionally execute its own verification, and may rely on an authentication token or other authentication verification embedded in the request. In other examples, the instance data service 120 may independently verify the integrity and/or authenticity of one or both the requesting IDM 110 and/or the requesting virtual machine 108 by referencing, e.g., the physical host 116 or the virtualization layer 112.

Each virtual instance 108 may be associated with various instance data that may be used to configure or manage the instance. This instance data may be determined based at least in part on configuration parameters describing the instance. Instance data may also include various information provided by a customer for customizing or managing the instance, and such customer-generated instance data may be arbitrary (e.g., freely definable, and not necessarily connected with the operation of the instance itself). Although the term "instance data" is used herein, other terms such as "configuration data" or "instance metadata" may be used interchangeably to refer to the same data. Some examples of instance data include hardware specifications of the instance (e.g., the number of virtual central processing units (CPUs), memory, storage capacity, etc.), network information associated with the instance (e.g., hostnames, Internet Protocol addresses, networking interface information, etc.), and other information corresponding to the instance, such as operating system type, instance architecture (e.g., 32- or 64-bit). Other examples of instance data include data (e.g., metadata) specific to operation of external services connected with or incident to the operation of the virtual instances 108.

As mentioned, entities, such as customers 102 or external services, may also provide instance data for the instance that are used to further customize the configuration or management of the instance. Such instance data may include, for example, custom parameters, scripts or programs, and/or various cryptographic keys (e.g., public/private keys) that the instance can access and utilize when running Such information can be provided as strings of text or as files (e.g., JavaScript Object Notation (JSON) files). One example of a custom parameter includes flags or parameters for customizing an instance or software running on the instance. For example, a user may provision an instance to run a webserver. When provisioning the instance, the user may provide instance data identifying which webserver configuration file (e.g., "httpd-config=/network/storage/httpd.conf" or "httpd-config=/network/storage/httpd-test.conf") should be used by the web server. The instance can then be instructed to utilize the instance data to determine which configuration file to use for configuring its webserver.

The instance data service 120 may be implemented using the same or different physical hardware 114 as used to implement the virtual computer system service 106. The instance data service 120 may operate in connection with the provisioning, operation, destruction, and/or suspension of a give virtual instance 108, and may receive and or provide instance data associated with such provisioning, operation, destruction, and/or suspension on an instance data store 122. For example, when a virtual instance 108 is newly provisioned, e.g., by a customer 102, the newly provisioned virtual instance 108 may provide associated instance data to the instance data service 120 for storage in the instance data store. Other actions may cause the instance data service to push instance data updates, e.g., as directly received from the customer 102 by the instance data service, or in some embodiments, from a service external to the virtual computer system service 106, to the virtual instances 108 for processing and local storage by the respective instance data manager 110 residing on the virtual instances 108 to which they apply. It is contemplated that the flow of instance data between the instance data service 120, the virtual computer system service, the customer 102, and other entities (e.g., external services), may in certain embodiments be bidirectional.

As mentioned, instance data may include configuration parameters provided for the instance in connection with the provisioning thereof (e.g., included within a request by, e.g., the customer 102 to provision such virtual instances). This instance data may also include any data (e.g., metadata) provided to further customize the configuration or management of the instance, as described above. An instance can utilize an instance data manager running on the guest operating system of the instance to access the instance data service 120 for obtaining and/or updating instance data.

Given the capability of the instance data service 120 to receive and process instance data requests, as well as provide instance data (whether newly created or updated) with a plurality of virtual instances 108 at a given time, it is contemplated that a customer 102 may update instance data related to arbitrarily defined groups of a fleet of virtual instances 108 under its control using, e.g., tags (such as those previously described) or other common identifiers, so as to, e.g., alter operational characteristics of some or all of a given fleet of virtual instances without necessitating individual alteration of each instance.

Additionally, the programmatic layer 118 allows updates to instance data to be submitted from other sources external to an instance to which the update applies, using a well-known format (e.g., as may be provided by an API or other such programmatic construct). For example, an external service may submit updates to instance data via the API for one or more virtual instances connected or otherwise associated therewith. The external service may, for example, use such instance data to signal operational state to other external services or to a customer utilizing the virtual instances, so as to appropriately coordinate multi-service or multi-instance activities and actions. As another example, a customer or other entity may use a given virtual instance to submit updates to other virtual instances within the customer's/entity's purview. As may be contemplated, inter-instance or service-instance communication may enable activities involving multiple virtual instances, multiple services, or both, to be easily coordinated and managed centrally from an entry closer to the originator or participant of/in the activity/ies.

In some embodiments, the instance data service synchronizes the instance data, with virtual instances 108 through an instance data manager 110 resident on the virtual instance, in accordance with various operational states that can be defined to trigger such synchronization. For example, regardless of the operational state of the virtual instance (e.g., the originating instance, or other instances to which instance data is intended to apply), instance data is persisted in the instance data store 112. In this example, if the virtual instance is suspended, powered off, or rebooted, the instance data service synchronizes the instance data with the applicable virtual instance 108 when operation of the virtual instance is restored or otherwise resumed. Such instance data may, for example, have been updated by an external source (e.g., an external service, the customer 102, or another virtual instance 108) while that particular virtual instance 108 was offline, but such changes would still be made to that virtual instance 108 when its operation resumed.

In some embodiments, the instance data service 120 may provide notifications to customers 102 or other entities (such as external services) are notified when certain sets of instance data (the identity of which may be predefined by, e.g., the entity receiving such notifications) is updated, manipulated, removed, added, or the like. Such notifications may be pushed from the instance data managers 110, the instance data service 120, or external services responsible for the instance data that was updated (as discussed below). For example, in scenarios where the local instance data manager for a given virtual instance 108 receives an update, the instance data manager 110 may submit a notification to a listening entity. As another example, if the instance data service 120 receives an update that has not yet propagated to the virtual instances 108, the instance data service may provide a notification to the listening entity to that effect. Various implementations may regard different entities as authoritative with regard to the instance data, and as a result, a given implementation may include notifications from the instance data managers 110, the instance data service 120, an external service, or some combination thereof, as is appropriate for the particular implementation.

The notifications may be provided using one or more of a number of mechanisms. For example, the notifications may be provided in connection with a specific request by an entity, such as a customer 102. As another example, a server push mechanism may be used to provide the notification to the relevant entity. As yet another example, a customer may open a long-poll connection, during which the notifying entity may provide a relevant notification if an instance data update occurs during the interval selected for the long-poll connection. In some embodiments, the mechanism of delivery is selectable by the entity receiving the notifications, and more than one mechanism may be used (either simultaneously or in sequence, e.g., if a prior attempt at notification was unsuccessful).

Figure 2:
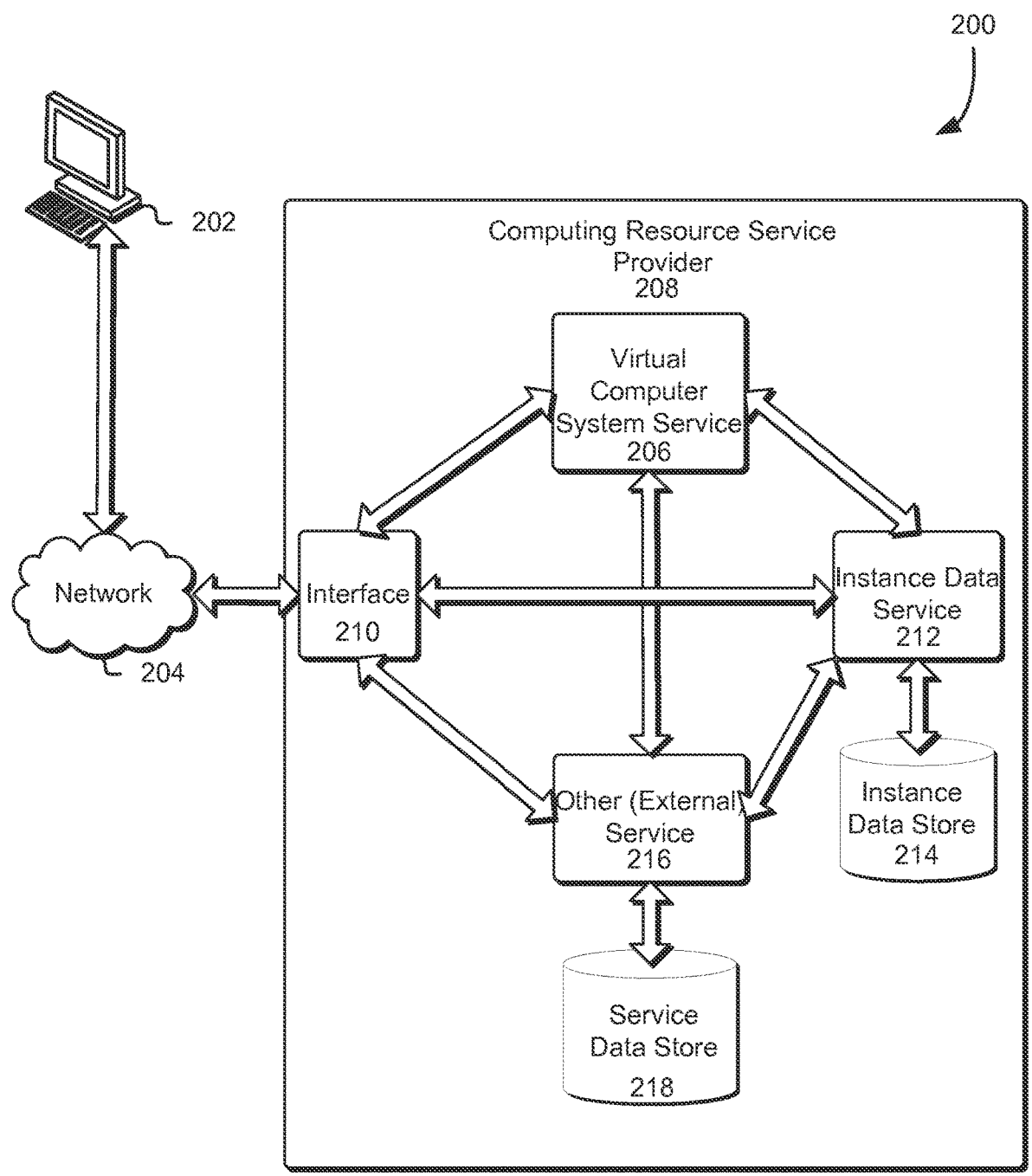
FIG. 2 schematically illustrates an environment in which a customer entity communicates with various instance data-related services and data stores of a computing resource service provider, in accordance with some embodiments.

FIG. 2 schematically illustrates an environment in which a customer entity communicates with various instance data-related services and data stores of a computing resource service provider, in accordance with some embodiments. As previously mentioned in connection with FIG. 1, a customer entity (also referred to as simply "customer") 202 connects via, e.g., network 204 to a virtual computer system service 206 and, in some embodiments, other entities of a computing resource service provider 208, such as an instance data service 212 or other services 216 via an interface 210, which, in some embodiments, may include one or more programmatic layers similar to the programmatic layer 118 described above in connection with FIG. 1. It is noted that additional services may be provided in addition to or as an alternative to services explicitly described. As described, the various services provided may include one or more web service interfaces or other programmatic interfaces (e.g., interface 210, or other interfaces specific to the various services) that enable the customer 202 to submit appropriately configured application programming interface or web service calls to the various services through web service requests. In addition, each of the services may include one or more service interfaces that enable the services to access each other (e.g., to enable a virtual computer system of the virtual computer system service 206 to store data in or retrieve data from the instance data service 212 or other service 216).

As illustrated, the various components and services of the computing resource service provider 208 may be interconnected to varying degrees depending on the implementation. Some or all of the interconnections may be bidirectional, so as to enable the notification, multi-lateral and/or multi-tenant updating of instance data, and other functionality previously described. The customer 202, for example, may use the virtual computer system service 206, the instance data service 212, and other services 216 directly (e.g., through network 204 and interface 210). As may be contemplated, the usage thereof may cause instance data to be updated by multiple different actors over a period of time, including by the customer 202 itself. The various services, as well as the data stores and other entities involved in the propagation, persistence, and manipulation of instance data (e.g., instance data managers associated with virtual instances of the virtual computer system service 206, instance data stores 214 associated with instance data services 212, and service data stores 218 associated with external services 216) may coordinate, according to the operational state of the respective services and abstractions thereof, the instance data among them and may transmit information regarding the instance data (as well as the instance data themselves) therebetween so as to ensure consistency of the instance data.

In some embodiments, instance data to be submitted from other sources external to an instance to which the update applies, using a well-known format (e.g., as may be provided by an API or other such programmatic construct). For example, an external service 216 may submit updates to instance data via the API for one or more virtual instances connected or otherwise associated therewith. The external service 216 may, for example, use such instance data to signal operational state to other external services or to a customer utilizing the virtual instances, so as to appropriately coordinate multi-service or multi-instance activities and actions. As another example, a customer or other entity may use a given virtual instance to submit updates to other virtual instances within the customer's/entity's purview. As may be contemplated, inter-instance or service-instance communication may enable activities involving multiple virtual instances, multiple services, or both, to be easily coordinated and managed centrally from an entry closer to the originator or participant of/in the activity/ies.

In some embodiments, as previously mentioned, an external service 216 responds to and/or processes instance data requests (e.g., received from the customer 202) directly. In some of such embodiments, instance data update requests relevant to the service 216 are forwarded by (e.g., proxied by) a receiving instance data manager (e.g., within the virtual computer system 206) and/or by the instance data service 212 to the external service 216 for handling. The external service 216 then processes the proxied request internally and responds to the request, either directly to the requestor or through the proxying entity (e.g., the instance data manager and/or instance data service 212). In some embodiments, the external service is responsible for storing the instance data relevant to that service, e.g., in a service data store 218. In some embodiments, the customer 202 may interact directly with the external service 216 to obtain and/or manipulate the instance data for which the external service is responsible (e.g., and which it may store on service data store 218), rather than providing such updates by proxy with, e.g., the instance data service 212.

Figure 3:
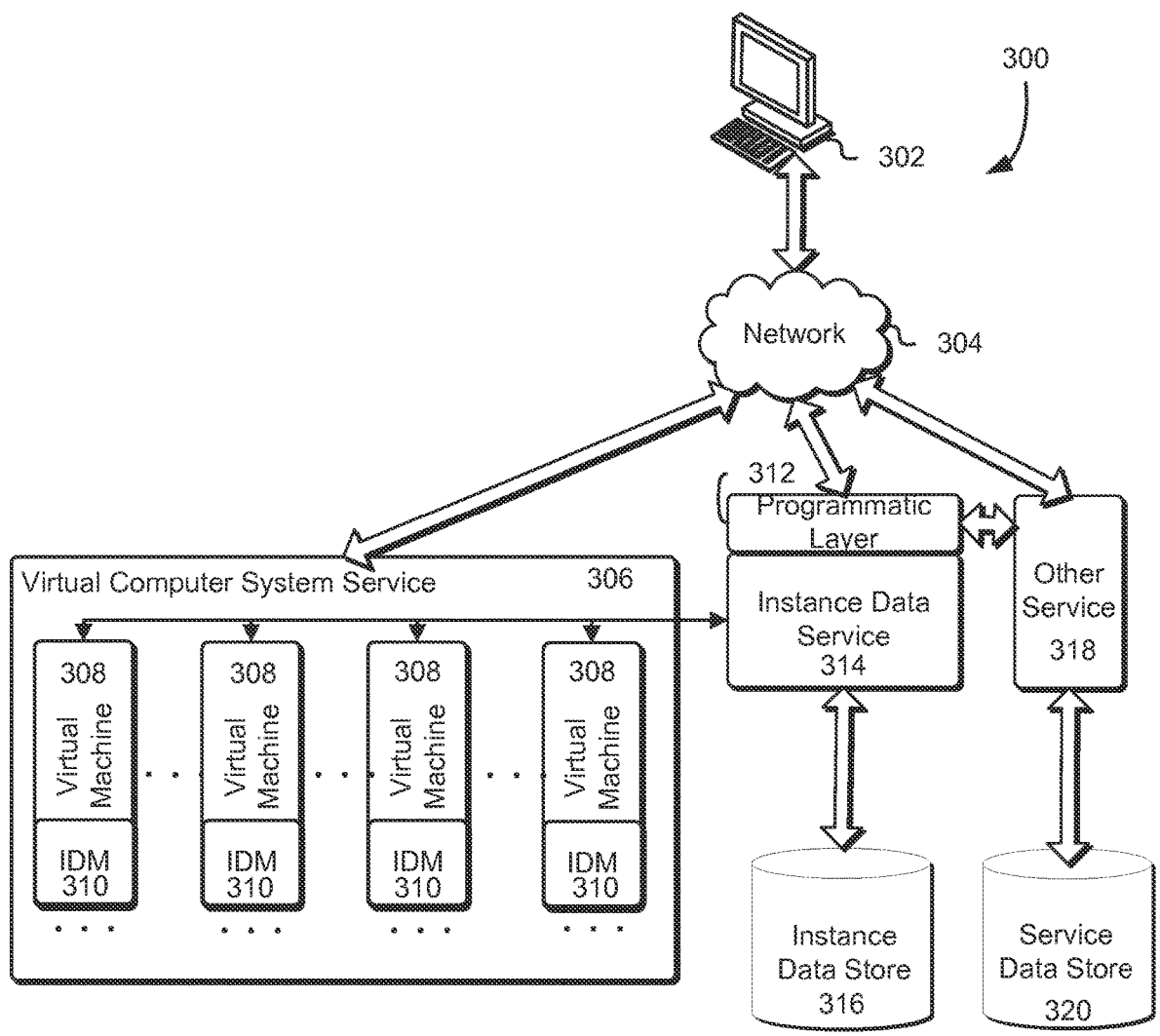
FIG. 3 schematically illustrates an environment in which one or more external services are capable of interacting with an instance data service and a plurality of virtual instances so as to manage instance data, in accordance with some embodiments.

FIG. 3 schematically illustrates an environment in which one or more external services are capable of interacting with an instance data service and a plurality of virtual instances so as to manage instance data, in accordance with some embodiments. As previously mentioned, a customer 302 connects via, e.g., network 304 to a virtual computer system service 306 and, in some embodiments, may also directly connect with an instance data service 314 via programmatic layer 312, as well as other (external) services 318. The virtual computer system service 306, instance data service 314, and various other services 318 and functionalities described herein may be provided by a computing resource service provider.

As previously mentioned, the virtual computer system service 306 may be a collection of computing resources configured to instantiate virtual instances on behalf of the customer 302. The customer 302 may interact with the virtual computer system service 306 (via appropriately configured and authenticated API calls) to provision and operate virtual computer systems 308 that are instantiated on physical computing devices hosted and operated by the computing resource service provider. Upon configuration, a virtual machine 308 of the virtual computer system service 306, may be registered with a customer resource tagging service provided by the computing resource service provider (or, in some embodiments, directly by the virtual computer system service 306), and the customer resource tagging service may associate one or more appropriately configured tags or other identifiers with the resource.

Also as previously mentioned, the virtual instances 308 may each include at least one instance data manager 310 running within the respective virtual instance 308, such as on a guest operating system operating on the respective virtual instance 308. Each instance data manager 310 may be configured to interact with the instance data service 314, either directly or via a programmatic layer 312 (e.g., over the network 304). The instance data managers 310 may query the instance data service 314 for various instance data (e.g., metadata) persisted on an instance data store 316 connected therewith, and store the instance data obtained from the instance data service 314 in memory of the guest operating system. In some embodiments, the instance data manager can be part of a software development kit provided by the computing resource service provider to the customer 302.

As mentioned, entities, such as customers 302 or external services 318, may also provide instance data for the instance that are used to further customize the configuration or management of the instance. Such instance data may include, for example, custom parameters, scripts or programs, and/or various cryptographic keys (e.g., public/private keys) that the instance can access and utilize when running Such information can be provided as strings of text or as files (e.g., JavaScript Object Notation (JSON) files). The instance data service 316 may operate in connection with the provisioning, operation, destruction, and/or suspension of a give virtual instance 308, and may receive and or provide instance data associated with such provisioning, operation, destruction, and/or suspension on an instance data store 316. For example, when a virtual instance 308 is newly provisioned, e.g., by a customer 302, the newly provisioned virtual instance 308 may provide associated instance data to the instance data service 314 for storage in the instance data store. Other actions may cause the instance data service to push instance data updates, e.g., as directly received from the customer 302 by the instance data service, or in some embodiments, from a service 318 external to the virtual computer system service 306, to the virtual instances 308 for processing and local storage by the respective instance data managers 310 residing on the virtual instances 308 to which they apply. It is contemplated that the flow of instance data between the instance data service 314, the virtual computer system service, the customer 302, and other entities (e.g., external services), may in certain embodiments be bidirectional.

As mentioned, instance data may include configuration parameters provided for the instance in connection with the provisioning thereof (e.g., included within a request by, e.g., the customer 302 to provision such virtual instances). This instance data may also include any data (e.g., metadata) provided to further customize the configuration or management of the instance, as described above. An instance can utilize an instance data manager 310 running on the guest operating system of the instance to access the instance data service 314 for obtaining and/or updating instance data.

Given the capability of the instance data service 314 to receive and process instance data requests, as well as provide instance data (whether newly created or updated) with a plurality of virtual instances 308 at a given time, it is contemplated that a customer 302 may update instance data related to arbitrarily defined groups of a fleet of virtual instances 308 under its control using, e.g., tags (such as those previously described) or other common identifiers, so as to, e.g., alter operational characteristics of some or all of a given fleet of virtual instances without necessitating individual alteration of each instance.

Additionally, the programmatic layer 312 allows updates to instance data to be submitted from other sources external to an instance to which the update applies, using a well-known (e.g., published) format (e.g., as may be provided by an API or other such programmatic construct). For example, an external service 318 may submit updates to instance data via the API 312 for one or more virtual instances 308 connected or otherwise associated therewith. The external service 318 may, for example, use such instance data to signal operational state to other external services or to a customer utilizing the virtual instances, so as to appropriately coordinate multi-service or multi-instance activities and actions. As another example, a customer or other entity may use a given virtual instance to submit updates to other virtual instances within the customer's/entity's purview. As may be contemplated, inter-instance or service-instance communication may enable activities involving multiple virtual instances, multiple services, or both, to be easily coordinated and managed centrally from an entry closer to the originator or participant of/in the activity/ies.

In some embodiments, the instance data service synchronizes the instance data, with virtual instances 308 through an instance data manager 310 resident on the virtual instance, in accordance with various operational states that can be defined to trigger such synchronization. For example, regardless of the operational state of the virtual instance (e.g., the originating instance, or other instances to which instance data is intended to apply), instance data is persisted in the instance data store 316. In this example, if the virtual instance is suspended, powered off, or rebooted, the instance data service synchronizes the instance data with the applicable virtual instance 308 when operation of the virtual instance is restored or otherwise resumed. Such instance data may, for example, have been updated by an external source (e.g., an external service 318, the customer 302, or another virtual instance 308) while that particular virtual instance 308 was offline, but such changes would still be made to that virtual instance 308 when its operation resumed.

In some embodiments, updates to instance data have predefined lifetimes, outside of which they will not be synchronized to one or more virtual instances. For example, an update to instance metadata may be defined by either an external service or a customer, and further specified to be applied to a subset of instances as previously discussed. Some or all of the updates may include one or more conditions for their application, such as predefined lifetimes during which they are applicable. If an instance metadata update is targeted to a set of virtual instances during a period of validity (e.g., during the update's predefined lifetimes), if such virtual instances are available to receive and process the metadata update so as to update their local instance metadata sets, the updates will be applied. If the virtual instances are not available at the time of receiving the instance metadata update, but come online during the predefined lifetime and is able to complete application of such updates, their respective instance metadata are likewise updated. However, if the virtual instances are not available at the time of receiving the instance metadata update and do not come online during the update's period of validity, the updates will not be applied to such virtual instances. Notifications as to the success and/or failure of such updates may be conducted as previously described.

In some embodiments, the instance data service 314 may provide notifications to customers 302 or other entities (such as external services) are notified when certain sets of instance data (the identity of which may be predefined by, e.g., the entity receiving such notifications) is updated, manipulated, removed, added, or the like. Such notifications may be pushed from the instance data managers 310, the instance data service 314, or external services responsible for the instance data that was updated (as discussed below). For example, in scenarios where the local instance data manager 310 for a given virtual instance 308 receives an update, the instance data manager 310 may submit a notification to a listening entity (e.g., the customer 302, and/or the service 318). As another example, if the instance data service 314 receives an update that has not yet propagated to the virtual instances 308, the instance data service may provide a notification to the listening entity to that effect. Various implementations may regard different entities as authoritative with regard to the instance data, and as a result, a given implementation may include notifications from the instance data managers 310, the instance data service 314, an external service 318, or some combination thereof, as is appropriate for the particular implementation.

The notifications may be provided using one or more of a number of mechanisms. For example, the notifications may be provided in connection with a specific request by an entity, such as a customer 302. As another example, a server push mechanism may be used to provide the notification to the relevant entity. As yet another example, a customer may open a long-poll connection, during which the notifying entity may provide a relevant notification if an instance data update occurs during the interval selected for the long-poll connection. In some embodiments, the mechanism of delivery is selectable by the entity receiving the notifications, and more than one mechanism may be used (either simultaneously or in sequence, e.g., if a prior attempt at notification was unsuccessful).

In some embodiments, as previously mentioned, an external service 318 responds to and/or processes instance data requests (e.g., received from the customer 302) directly. In some of such embodiments, instance data update requests relevant to the service 318 are forwarded by (e.g., proxied by) a receiving instance data manager 310 (e.g., within the virtual computer system 306) and/or by the instance data service 314 to the external service 318 for handling. The external service 318 then processes the proxied request internally and responds to the request, either directly to the requestor or through the proxying entity (e.g., the instance data manager and/or instance data service 314). In some embodiments, the external service 318 is responsible for storing the instance data relevant to that service, e.g., in a service data store 320. In some embodiments, the customer 202 may interact directly with the external service 318 to obtain and/or manipulate the instance data for which the external service is responsible (e.g., and which it may store on service data store 316), rather than providing such updates by proxy with, e.g., the instance data service 314.

As previously mentioned, the external service 318 may interact with the instance data service 314 using the programmatic layer 312. The programmatic layer 312 may, as also previously discussed, provide a standardized and consistent way in which any given external service can interact with the instance data service 314 and thereon provide instance data updates to a large quantity of virtual instances 308 connecting therewith, in a fashion that is agnostic to the specific operational state of individual virtual instances 308. Furthermore, the external services 318 may, through programmatic layer 312, offload some of the operational load from the instance data service 314 (and instance data store 316) by locally administering at least some of the instance data that would otherwise be handled by the instance data service 314.

Figure 4:
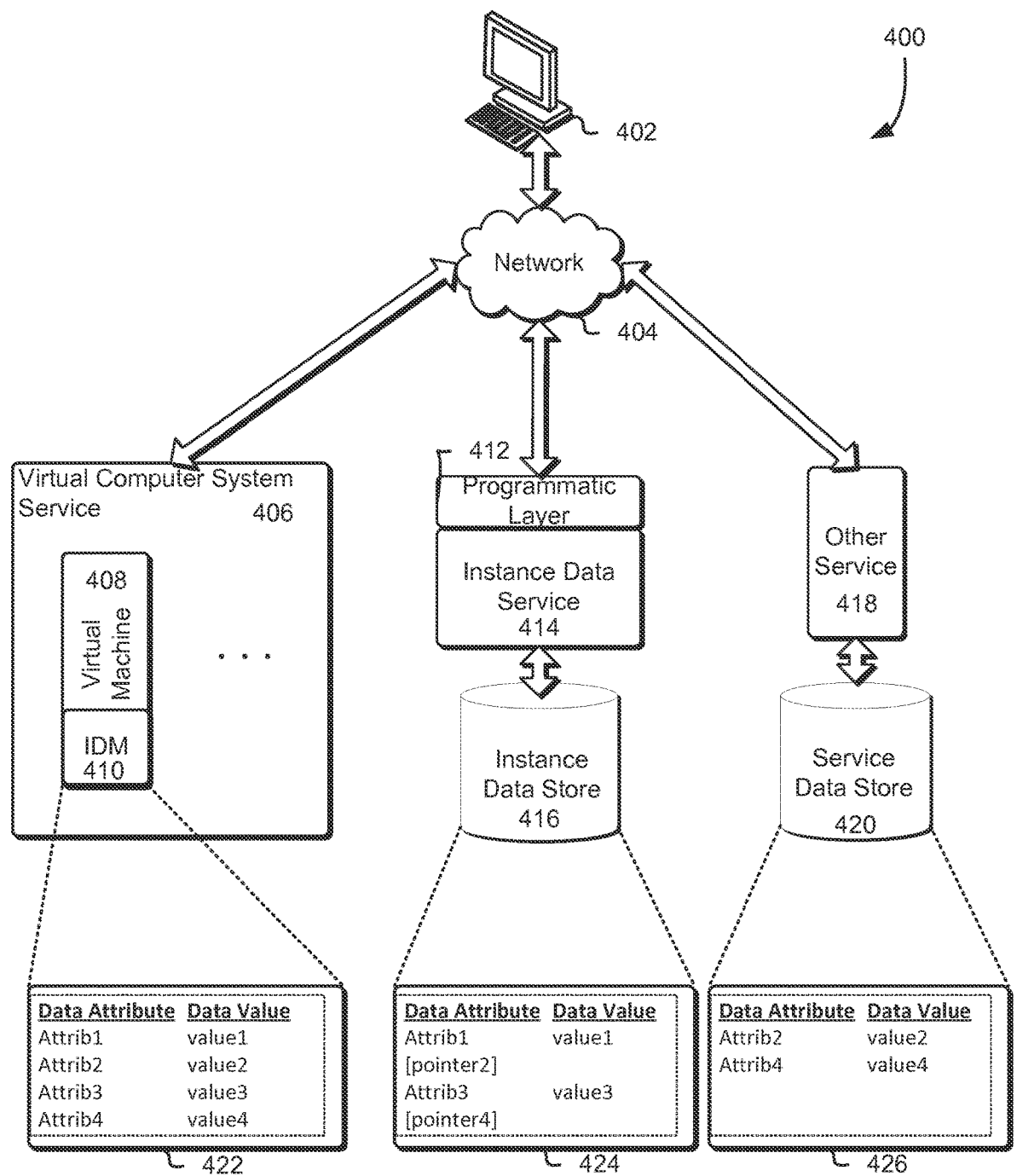
FIG. 4 schematically illustrates an environment in which one or more external services are capable of interacting with an instance data service and a plurality of virtual instances so as to interact, by proxy, with requesters of instance data, in accordance with some embodiments.

FIG. 4 schematically illustrates an environment in which one or more external services are capable of interacting with an instance data service and a plurality of virtual instances so as to interact, by proxy, with requesters of instance data, in accordance with some embodiments. As previously mentioned, a customer 402 connects via, e.g., network 404 to a virtual computer system service 406 and, in some embodiments, may also directly connect with an instance data service 414 via programmatic layer 412, as well as other (external) services 418. The virtual computer system service 406, instance data service 414, and various other services 418 and functionalities described herein may be provided by a computing resource service provider.

Also as previously mentioned, virtual instances 408 instantiated by virtual computer system service 406 may each include at least one instance data manager 410 running within the respective virtual instance 408, such as on a guest operating system operating on the respective virtual instance 408. Each instance data manager 410 may be configured to interact with the instance data service 414, either directly or via a programmatic layer 412 (e.g., over the network 404). The instance data managers 410 may query the instance data service 414 for various instance data (e.g., metadata) persisted on an instance data store 416 connected therewith, and store the instance data obtained from the instance data service 414 in memory of the guest operating system. In some embodiments, the instance data manager can be part of a software development kit provided by the computing resource service provider to the customer 402.

As mentioned, entities, such as customers 402 or external services 418, may also provide instance data for the instance that are used to further customize the configuration or management of the instance. The instance data service 416 may operate in connection with the provisioning, operation, destruction, and/or suspension of a give virtual instance 408, and may receive and or provide instance data associated with such provisioning, operation, destruction, and/or suspension on an instance data store 416. For example, when a virtual instance 408 is newly provisioned, e.g., by a customer 402, the newly provisioned virtual instance 408 may provide associated instance data to the instance data service 414 for storage in the instance data store. Other actions may cause the instance data service to push instance data updates, e.g., as directly received from the customer 402 by the instance data service, or in some embodiments, from a service 418 external to the virtual computer system service 406, to the virtual instances 408 for processing and local storage by the respective instance data managers 410 residing on the virtual instances 408 to which they apply. It is contemplated that the flow of instance data between the instance data service 414, the virtual computer system service, the customer 402, and other entities (e.g., external services), may in certain embodiments be bidirectional.

As mentioned, instance data may include configuration parameters provided for the instance in connection with the provisioning thereof (e.g., included within a request by, e.g., the customer 402 to provision such virtual instances). This instance data may also include any data (e.g., metadata) provided to further customize the configuration or management of the instance, as described above. An instance can utilize an instance data manager 410 running on the guest operating system of the instance to access the instance data service 414 for obtaining and/or updating instance data.

Additionally, the programmatic layer 412 allows updates to instance data to be submitted from other sources external to an instance to which the update applies, using a well-known (e.g., published) format (e.g., as may be provided by an API or other such programmatic construct). For example, an external service 418 may submit updates to instance data via the API 412 for one or more virtual instances 408 connected or otherwise associated therewith. The external service 418 may, for example, use such instance data to signal operational state to other external services or to a customer utilizing the virtual instances, so as to appropriately coordinate multi-service or multi-instance activities and actions. As another example, a customer or other entity may use a given virtual instance to submit updates to other virtual instances within the customer's/entity's purview. As may be contemplated, inter-instance or service-instance communication may enable activities involving multiple virtual instances, multiple services, or both, to be easily coordinated and managed centrally from an entry closer to the originator or participant of/in the activity/ies.

In some embodiments, the instance data service synchronizes the instance data, with virtual instances 408 through an instance data manager 410 resident on the virtual instance, in accordance with various operational states that can be defined to trigger such synchronization. For example, regardless of the operational state of the virtual instance (e.g., the originating instance, or other instances to which instance data is intended to apply), instance data is persisted in the instance data store 416. In this example, if the virtual instance is suspended, powered off, or rebooted, the instance data service synchronizes the instance data with the applicable virtual instance 408 when operation of the virtual instance is restored or otherwise resumed. Such instance data may, for example, have been updated by an external source (e.g., an external service 418, the customer 402, or another virtual instance 408) while that particular virtual instance 408 was offline, but such changes would still be made to that virtual instance 408 when its operation resumed.

In some embodiments, the instance data service 414 may provide notifications to customers 402 or other entities (such as external services) are notified when certain sets of instance data (the identity of which may be predefined by, e.g., the entity receiving such notifications) is updated, manipulated, removed, added, or the like. Such notifications may be pushed from the instance data managers 410, the instance data service 414, or external services responsible for the instance data that was updated (as discussed below). For example, in scenarios where the local instance data manager 410 for a given virtual instance 408 receives an update, the instance data manager 410 may submit a notification to a listening entity (e.g., the customer 402, and/or the service 418). As another example, if the instance data service 414 receives an update that has not yet propagated to the virtual instances 408, the instance data service may provide a notification to the listening entity to that effect. Various implementations may regard different entities as authoritative with regard to the instance data, and as a result, a given implementation may include notifications from the instance data managers 410, the instance data service 414, an external service 418, or some combination thereof, as is appropriate for the particular implementation.

In some embodiments, as previously mentioned, an external service 418 responds to and/or processes instance data requests (e.g., received from the customer 402) directly. In some of such embodiments, instance data update requests relevant to the service 418 are forwarded by (e.g., proxied by) a receiving instance data manager 410 (e.g., within the virtual computer system 406) and/or by the instance data service 414 to the external service 418 for handling. The external service 418 then processes the proxied request internally and responds to the request, either directly to the requestor or through the proxying entity (e.g., the instance data manager and/or instance data service 414). In some embodiments, the external service 418 is responsible for storing the instance data relevant to that service, e.g., in a service data store 420. In some embodiments, the customer 202 may interact directly with the external service 418 to obtain and/or manipulate the instance data for which the external service is responsible (e.g., and which it may store on service data store 416), rather than providing such updates by proxy with, e.g., the instance data service 414.

As previously mentioned, the external service 418 may interact with the instance data service 414 using the programmatic layer 412. The programmatic layer 412 may, as also previously discussed, provide a standardized and consistent way in which any given external service can interact with the instance data service 414 and thereon provide instance data updates to a large quantity of virtual instances 408 connecting therewith, in a fashion that is agnostic to the specific operational state of individual virtual instances 408. Furthermore, the external services 418 may, through programmatic layer 412, offload some of the operational load from the instance data service 414 (and instance data store 416) by locally administering at least some of the instance data that would otherwise be handled by the instance data service 414.

An example involving proxying of instance data, as well as that of associated update requests, is illustrated in FIG. 4. During normal operation, a given virtual machine 408 may include a local key-value store (as propagated by the IDM 410) that includes the full set of instance data 422 associated with that particular instance. However, in the case that a customer 402 updates, adds, or deletes a given instance data, the change is propagated (synchronously or asynchronously) to the instance data store by way of the instance data service 414. If the instance data store 416 and/or the instance data service is locally responsible 424 for persisting a given attribute/value pair (e.g., attrib1/value1 or attrib3/value3 as illustrated), the update occurs within the instance data service and the instance data store. However, if the instance data updated is under control of an external service 418, the instance data service 414 may transparently proxy the update, and/or servicing of the request, to the relevant other service 418, 426. In some embodiments, the other service 418 may itself be responsible for storing the relevant instance data in its own service data store 420. It is also contemplated that such pointers and proxying may occur within the virtual machine 408 (e.g., 422), as well as in the other services 418, 426 (e.g., to point to other services connected therewith). In some embodiments, the layout of pointers may be hierarchical, and a given service may be responsible for an entire level or block of instance data but pass other levels or blocks of instance data to other services. Additionally, updates to instance data from any source (e.g., the instance data service itself, a service 418, etc.) may cause propagation to other copies of the instance data throughout the system.

Figure 5:
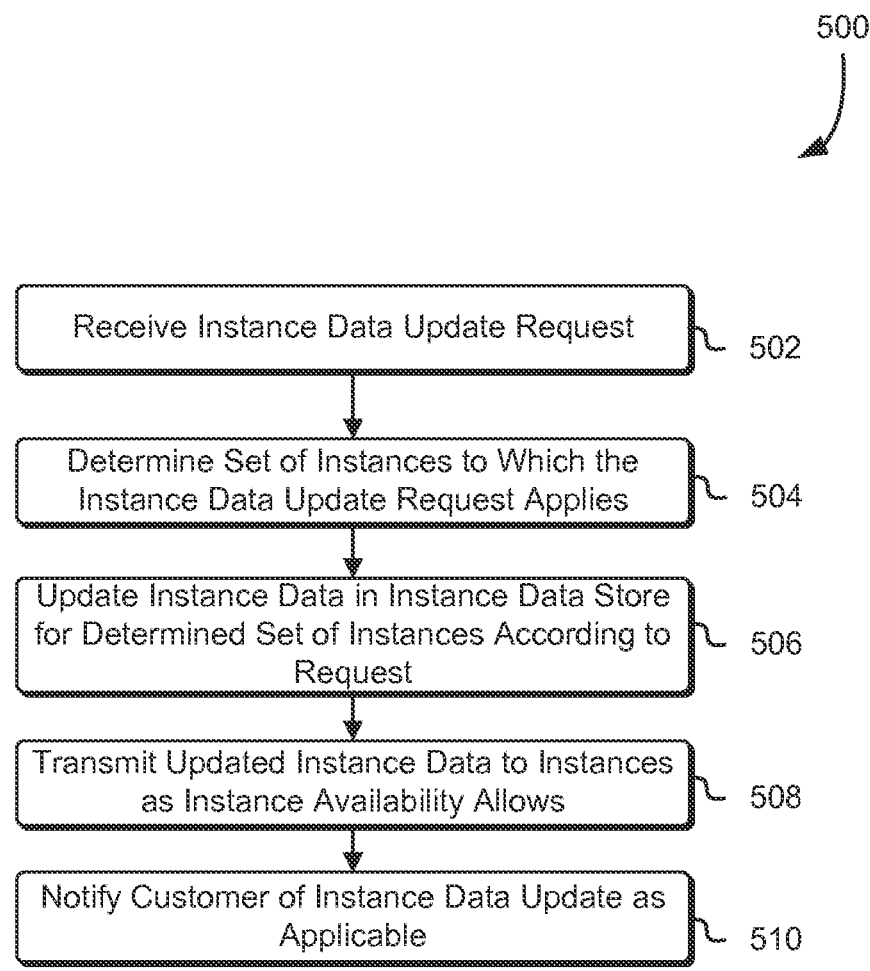
FIG. 5 schematically illustrates an example process for updating a plurality of virtual instances with updated instance data, in accordance with some embodiments.

FIG. 5 schematically illustrates an example process for updating a plurality of virtual instances with updated instance data, in accordance with some embodiments. At step 502, an entity, such as an instance data service or other resource capable of receiving and/or processing instance data and/or changes thereto, receives an instance data update request. At step 504, the entity (or another entity connected with the entity receiving the instance data update request in step 502) determines which set of instances to which the instance data update request received in step 502 applies. For example, the request may specify a tag or other identifier common to a plurality of virtual instances, in accordance with techniques described herein.

At step 506, the instance data is updated in accordance with the request for the set of instances determined in step 504. The data may be updated in the instance data store, for example, or, in embodiments where the instance data being update resides elsewhere, the responsible service or other identity is tasked with updating the instance data (e.g., within its own service data store, as previously discussed).

At step 508, the instance data updated at step 506 is transmitted, either synchronously or asynchronously, to the instances themselves. This may occur after a delay, if the instances for which the instance data is intended are not available (e.g., suspended, offline, busy, etc.). The transmission of such instance data may be direct to the instances, or, in some embodiments, may take place through a programmatic layer, such as that previously described.

At step 510, a customer (or other interested entity) is notified of the update to the instance data. As may be contemplated, this may be in direct connection with the update request, and such notification may be synchronous or asynchronous. In other embodiments, the notifications may occur if any instance data has been updated, and not necessarily in connection with a data update request. As previously discussed, the notification may be provided using a variety of techniques, including server push notification, long-polling, and the like.

Figure 6:
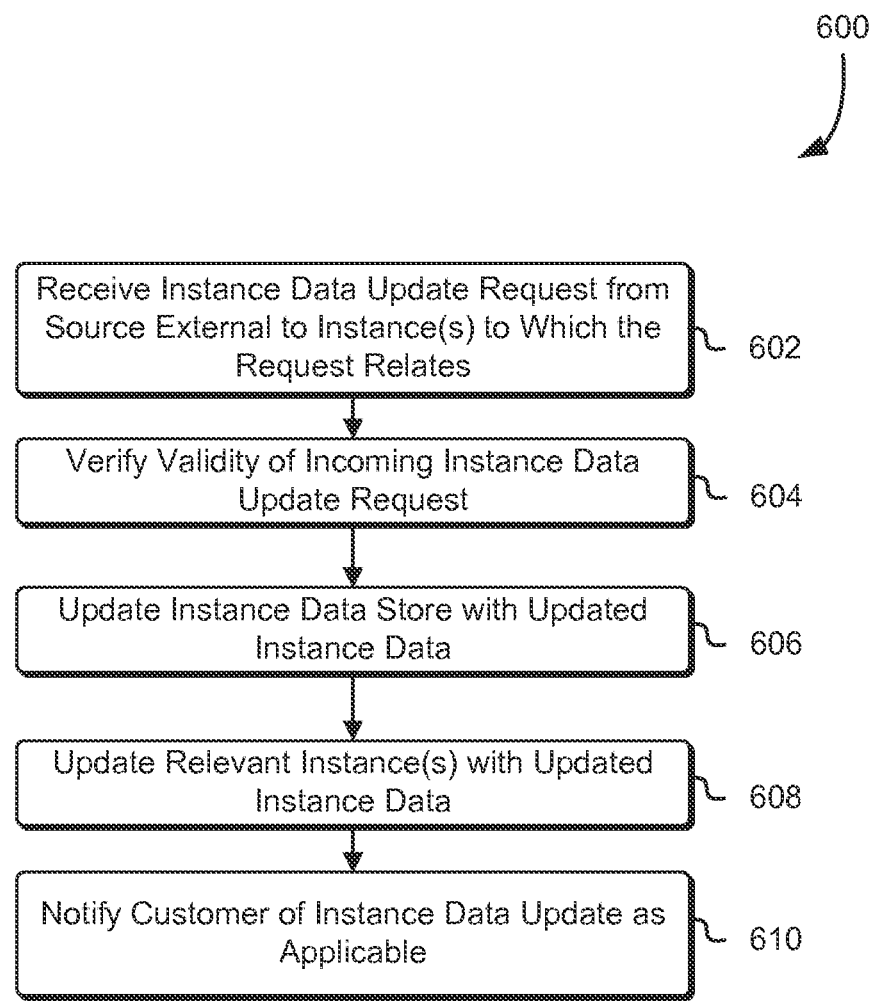
FIG. 6 schematically illustrates an example process for processing external requests to update instance data, in accordance with some embodiments.

FIG. 6 schematically illustrates an example process for processing external requests to update instance data, in accordance with some embodiments. At step 602, an entity, such as one responsible for persisting instance data, receives an instance data update request from a source external to the instance(s) to which the request relates. For example, the external source may be another instance not affected by the request, an external service, or directly from the customer to, e.g., the instance data update service previously described.

At step 604, the validity of the incoming instance data update request is verified, e.g., by verifying the credentials of the requestor, and after such validity is verified by an appropriate entity (e.g., an authentication service of a computing resource service provider). After such validity has been verified, the instance data store (or relevant pointer to external service data store) is updated in accordance with the validated request at step 606. At step 608, the instance data updated at step 506 is transmitted, either synchronously or asynchronously, to the instances themselves. This may occur after a delay, if the instances for which the instance data is intended are not available (e.g., suspended, offline, busy, etc.). The transmission of such instance data may be direct to the instances, or, in some embodiments, may take place through a programmatic layer, such as that previously described.

At step 610, a customer (or other interested entity) is notified of the update to the instance data. As may be contemplated, this may be in direct connection with the update request, and such notification may be synchronous or asynchronous. In other embodiments, the notifications may occur if any instance data has been updated, and not necessarily in connection with a data update request. As previously discussed, the notification may be provided using a variety of techniques, including server push notification, long-polling, and the like.

Figure 7:
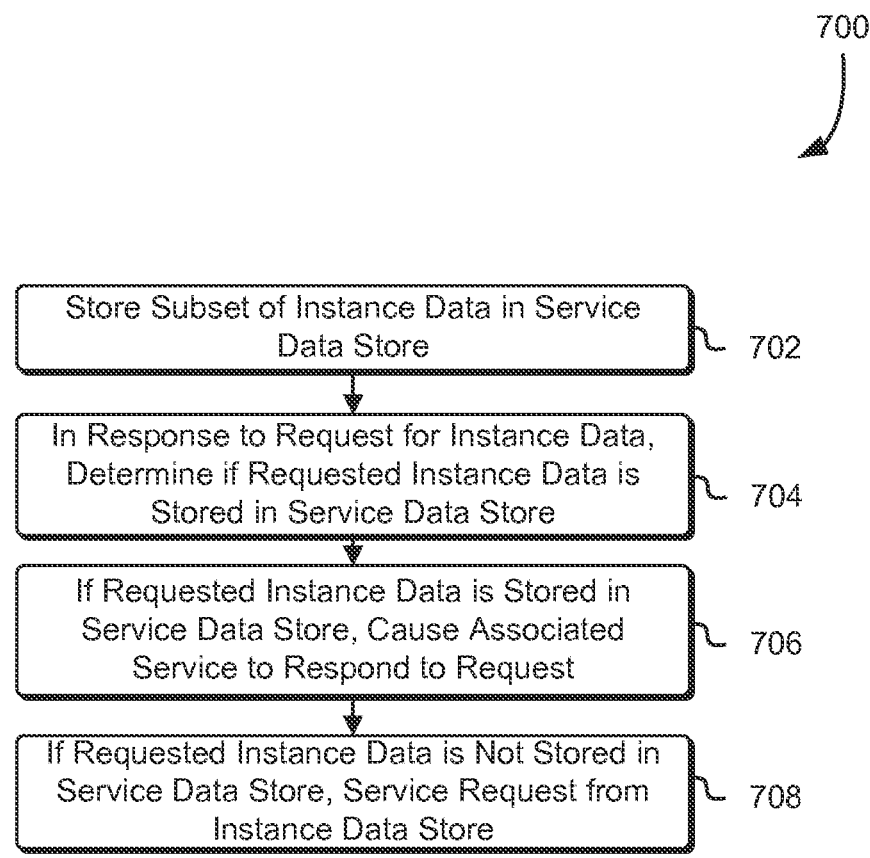
FIG. 7 schematically illustrates an example process for proxying and/or redirecting instance data update requests to external services, in accordance with some embodiments.

FIG. 7 schematically illustrates an example process for proxying and/or redirecting instance data update requests to external services, in accordance with some embodiments. At step 702, a subset of a set of instance data associated with the operation of one or more virtual instances is stored on the service data store of a service associated with that subset. At step 704, in response to a request for instance data within that set, an entity (which may include an instance data manager, an instance data service, or the external service itself) determines if the request instance data is stored within the service data store 704.

At step 706, if the requested data is determined at step 704 to be stored within the service data store (e.g., under control of the external service), the associated external service is caused to directly service the request and, in some embodiments, update the instance data within its service data store. However, at step 708, if the requested instance data relates to a different service or is serviced by the instance data service, the request is deferred to the relevant service and served out of the associated data store (e.g., the instance data store).

Figure 8:
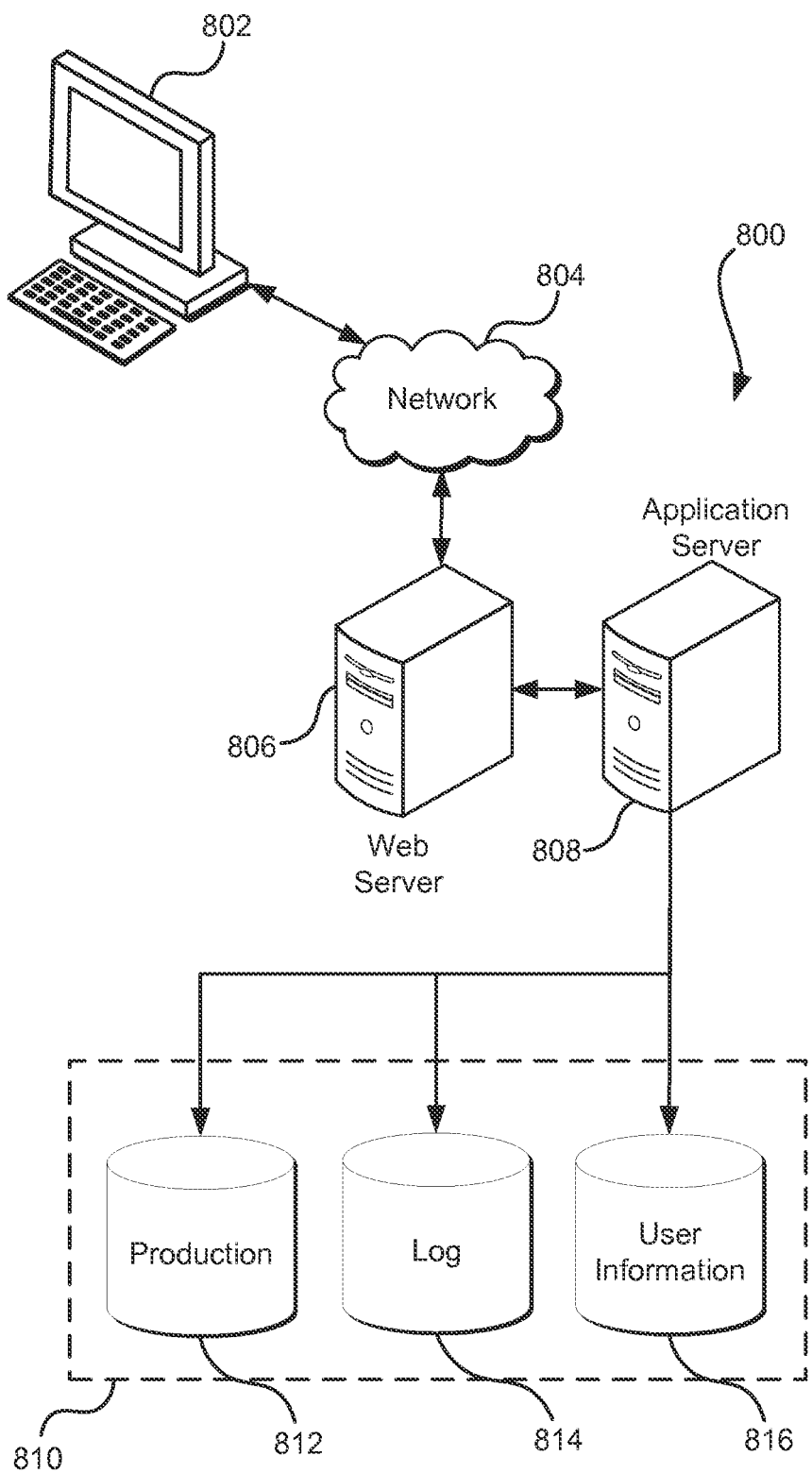
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   at least one processor; and
   memory including instructions that, as a result of being executed by the at least one processor, cause the system to:
   store instance data in an instance data store associated with the system, the instance data relating to operation of a plurality of virtual machine instances operating in connection with the system;
   associate a tag to at least a subset of the plurality of virtual machine instances; and
   in response to a request to update at least a portion of the instance data comprising configuration parameters to configure the subset of the plurality of virtual machine instances:
   determine whether the request includes the tag;
   if the request includes the tag, update the requested portion of the instance data for the subset of the plurality of virtual machine instances; and synchronize the updated portion of the instance data associated with the subset of the plurality of virtual machine instances.

2. The system of claim 1, wherein the instructions further cause the system to receive the request via a programmatic interface provided by the system.

3. The system of claim 1, wherein the tag is defined by a customer associated with the subset of the plurality of virtual machine instances.

4. The system of claim 1, wherein the tag includes an identification by an external service of the subset of the plurality of virtual machine instances.

5. The system of claim 4, wherein the system receives the request from the external service.

6. The system of claim 1, wherein the instructions further cause the system to update the requested portion of the instance data for the subset of the plurality of virtual machine instances by causing an external service to update the requested portion of the instance data in a service data store associated with the external service.

7. The system of claim 1, wherein the instructions further cause the system to notify a customer associated with the subset of the plurality of virtual machine instances that the portion of the instance data has been updated.

8. The system of claim 1, wherein the request originates from a virtual machine instance outside of the subset of the plurality of virtual machine instances.

9. A computer-implemented method, comprising:
    storing instance data in an instance data store associated with a system, the instance data relating to operation of a plurality of virtual machine instances operating in connection with the system;
    associating a tag to at least a subset of the plurality of virtual machine instances; and
    in response to a request to update at least a portion of the instance data comprising configuration parameters to configure the subset of the plurality of virtual machine instances:
    determine whether the request includes the tag;
    if the request includes the tag, update the requested portion of the instance data for the subset of the plurality of virtual machine instances; and
    synchronize the updated portion of the instance data associated with the subset of the plurality of virtual machine instances.

10. The computer-implemented method of claim 9, further comprising notifying a customer associated with the plurality of virtual instances of updates to the instance data.

11. The computer-implemented method of claim 9, wherein the update request is received via a programmatic interface.

12. The computer-implemented method of claim 9, wherein the update request is received from a virtual machine instance outside of the plurality of virtual machine instances.

13. A non-transitory computer-readable storage medium having stored thereon executable instructions that, as a result of being executed by one or more processors of a computer system, cause the computer system to at least: store instance data in an instance data store associated with the computer system, the instance data relating to operation of a plurality of virtual machine instances operating in connection with the computer system;
    associate a tag to at least a subset of the plurality of virtual machine instances; and
    in response to a request to update at least a portion of the instance data comprising configuration parameters to configure the subset of the plurality of virtual machine instances:
    determine whether the request includes the tag;
    if the request includes the tag, update the requested portion of the instance data for the subset of the plurality of virtual machine instances; and
    synchronize the updated portion of the instance data associated with the subset of the plurality of virtual machine instances.

14. The non-transitory computer-readable storage medium of claim 13, wherein the instructions further comprise instructions that, as a result of being executed by the one or more processors, cause the computer system to receive the request via a programmatic interface provided by the computer system.

15. The non-transitory computer-readable storage medium of claim 13, wherein the tag is defined by a customer associated with the subset of the plurality of virtual machine instances.

16. The non-transitory computer-readable storage medium of claim 13, wherein the tag includes an identification by an external service of the subset of the plurality of virtual machine instances.

17. The non-transitory computer-readable storage medium of claim 16, wherein the computer system receives the request from the external service.

18. The non-transitory computer-readable storage medium of claim 13, wherein the instructions further comprise instructions that, as a result of being executed by the one or more processors, cause the computer system to update the requested portion of the instance data for the subset of the plurality of virtual machine instances by causing an external service to update the requested portion of the instance data in a service data store associated with the external service.

19. The non-transitory computer-readable storage medium of claim 13, wherein the instructions further comprise instructions that, as a result of being executed by the one or more processors, cause the computer system to notify a customer associated with the subset of the plurality of virtual machine instances that the portion of the instance data has been updated.

20. The non-transitory computer-readable storage medium of claim 13, wherein the request originates from a virtual machine instance outside of the subset of the plurality of virtual machine instances.

* * * * *